United States Patent
Wong et al.

(10) Patent No.: US 12,176,812 B2
(45) Date of Patent: Dec. 24, 2024

(54) SLOPE COMPENSATION INDUCED OFFSET ERROR CANCELLATION IN A PEAK OR VALLEY CURRENT MODE SWITCHING VOLTAGE REGULATOR

(71) Applicant: TEXAS INSTRUMENTS INCORPORATED, Dallas, TX (US)

(72) Inventors: Kae Wong, Allen, TX (US); Rida Assaad, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 186 days.

(21) Appl. No.: 17/875,192

(22) Filed: Jul. 27, 2022

(65) Prior Publication Data
US 2024/0039405 A1    Feb. 1, 2024

(51) Int. Cl.
*H02M 3/158*    (2006.01)
*H02M 1/00*     (2006.01)

(52) U.S. Cl.
CPC ......... *H02M 3/158* (2013.01); *H02M 1/0009* (2021.05); *H02M 1/0025* (2021.05)

(58) Field of Classification Search
CPC ... H02M 3/158; H02M 1/0009; H02M 1/0025
See application file for complete search history.

(56) References Cited

U.S. PATENT DOCUMENTS

| | | | |
|---|---|---|---|
| 6,498,466 B1 | 12/2002 | Edwards | |
| 6,611,131 B2 | 8/2003 | Edwards | |
| 9,450,487 B2 | 9/2016 | Hari et al. | |
| 9,467,051 B2 | 10/2016 | Stoichita et al. | |
| 2021/0119533 A1* | 4/2021 | Liang | H02M 1/14 |

* cited by examiner

*Primary Examiner* — Rafael O De Leon Domenech
(74) *Attorney, Agent, or Firm* — Michelle F. Murray; Frank D. Cimino

(57) ABSTRACT

A converter includes an inductor and a transistor. A sense circuit couples to the transistor. The sense circuit generates a sense signal responsive to a current through the first transistor. A comparator has first and second comparator inputs and a comparator output. The comparator output controls a signal to the transistor's control input. An error amplifier has an error amplifier input and an error amplifier output coupled to the first comparator input. A slope compensation circuit couples to at least one of the error amplifier output or the sense circuit and generates a slope signal. A peak detection sample/hold (PK-S/H) tracks the slope signal and, responsive to the transistor being turned off, samples the slope signal and provides the sampled slope signal on its output. The PK-S/H output couples to whichever of the error amplifier or sense circuit to which the slope compensation circuit is not coupled.

18 Claims, 8 Drawing Sheets

SLOPE COMPENSATION INDUCED OFFSET ERROR CANCELLATION IN A PEAK OR VALLEY CURRENT MODE SWITCHING VOLTAGE REGULATOR

BACKGROUND

Voltage regulators use an input voltage to generate an output voltage at a regulated level. One type of voltage regulator is a switching regulator in which solid-state switches (e.g., metal oxide semiconductor field effect transistors) are turned on and off. The switches may be coupled to an inductor. When one of the switches is turned on, current through the inductor increases, and when that switch is turned off and another switch is turned on, the inductor current decreases. Switching regulators can be implemented as boost converters, buck converters, etc.

The switching frequency of the converter may be fixed or variable. Further, the duty cycle associated with the control of the switch(es) may be fixed or variable. One type of control technique for switching regulators is current mode control in which a clock is used to turn on a first switch, and the inductor current reaching a threshold signal (either peak or valley threshold) causes the control logic to turn off the first switch and turn on a second switch.

For switching regulators that implement fixed frequency switching and peak current mode control, the peak threshold signal should be slope-compensated when the duty cycle exceeds 50%. For valley mode control, the valley threshold signal should be slope-compensated when the duty cycle is less than 50%.

SUMMARY

In one example, a voltage converter includes an inductor and a first transistor having a first control input and first and second current terminals. The first current terminal couples to the inductor. A sense circuit couples to the first transistor. The sense circuit generates a sense signal responsive to a current through the first transistor. A comparator has first and second comparator inputs and a comparator output. The comparator output controls a signal to first control input. An error amplifier has an error amplifier input and an error amplifier output coupled to the first comparator input. A slope compensation circuit couples to at least one of the error amplifier output or the sense circuit and generates a slope signal. A peak detection sample-and-hold (PK S/H) tracks the slope signal and, responsive to the transistor being turned off, samples the slope signal and provides the sampled slope signal on the PK SH output. The peak detection S/H output couples to whichever of the error amplifier or the sense circuit to which the slope compensation circuit is not coupled.

DETAILED DESCRIPTION

For a current mode control switching regulator, an error amplifier amplifies the difference between the output voltage (Vout), or a scaled down version of Vout, and a reference voltage. The output signal from the error amplifier is provided to a control loop to control the timing of the converter's switching transistors to thereby regulate the current through the converter's inductor. Regulating the inductor current regulates the output voltage.

For robust safety protection concerns, over-current protection is desirable for a switching regulator. In some applications, it is helpful to monitor the inductor current to keep track of the load current for the regulator. Because the error signal is used to regulate the inductor current, one technique for providing over-current protection is to limit the maximum level of the error signal. Also, the error signal can be provided to an analog-to-digital converter to facilitate in the implementation of the load current tracking function, as described herein. Some switching regulators implement slope compensation. Slope compensation helps to maintain the converter in a stable operating condition, but the added slope compensation introduces a difference between the error signal and the inductor current. The addition of slope-compensation to the control loop thus makes it difficult to determine at what level the error signal should be limited for over-current protection and provide an accurate signal to implement the load current tracking function.

The embodiments described herein address this problem by sampling the slope signal responsive to the inductor current reaching the peak command (in the case of peak current control) or the valley command (in the case of valley current control). The sampled slope signal is then added into the control loop as an offset to cancel the effect of the addition of slope compensation. In such embodiments, the error signal from the error amplifier more closely represents the inductor current, and thus the error signal can be limited for over-current protection in a more accurate manner.

Figure 1:
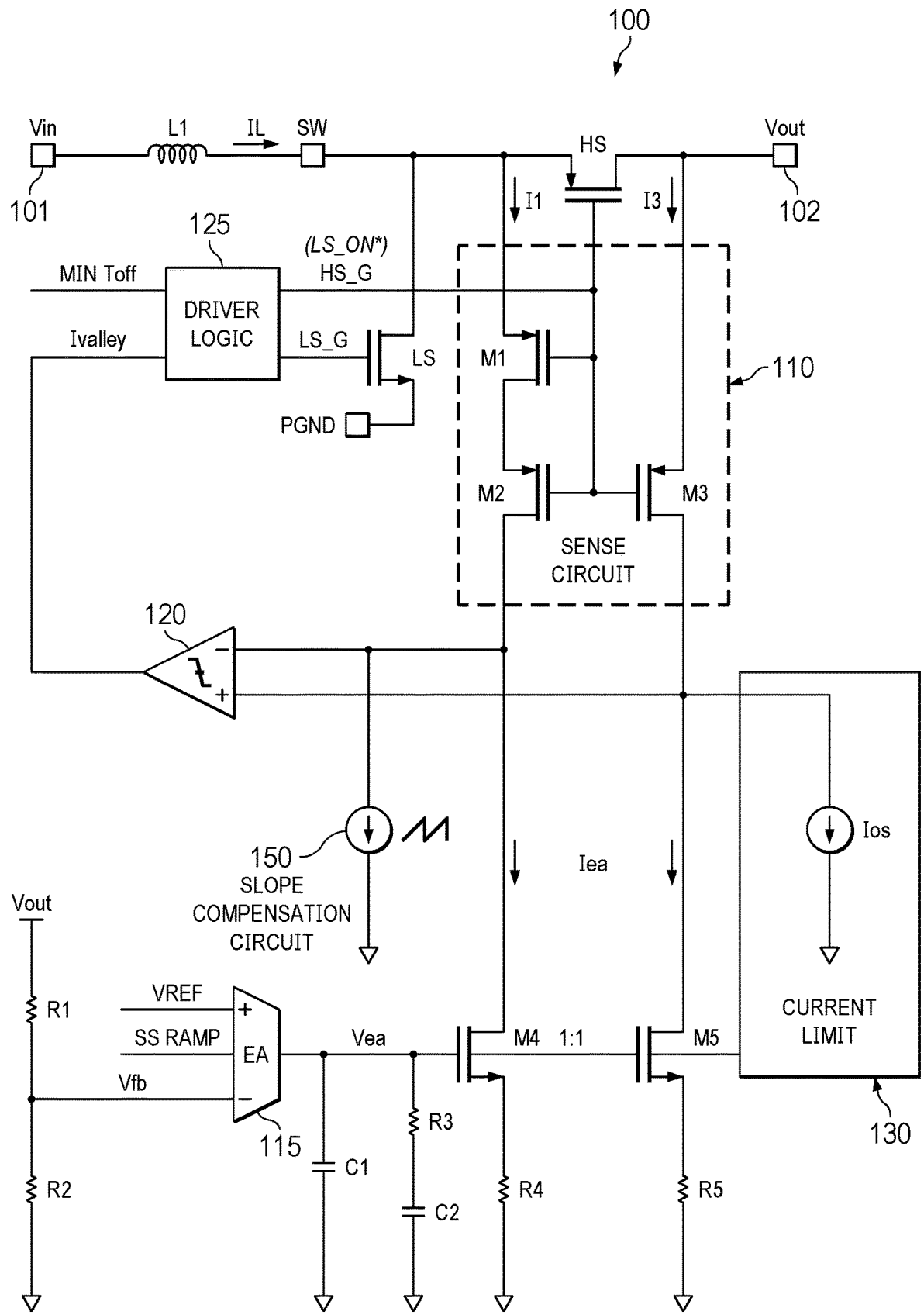
FIG. 1 is a schematic illustrating a boost converter that includes a slope compensation circuit, in accordance with an example.

Types of switching regulators include boost converters, buck converters, buck-boost converters, single-ended primary-inductor converters (SEPICs), etc. FIG. 1 is a schematic diagram of a boost converter 100. Boost converter 100 in the example of FIG. 1 has input terminal 101 and an output terminal 102. An input voltage Vin is coupled to the input terminal 101, and the converter 100 produces a regulated output voltage Vout on the output terminal 102. The boost converter 100 includes an inductor L1, a high-side (HS) transistor, a low-side (LS) transistor, a sense circuit 110, an error amplifier 115, resistors R1-R5, capacitors C1 and C2, a comparator 120, driver logic 125, a current limit circuit 130, a slope compensation circuit 150, and a current offset circuit 170. Resistors R1 and R2 are connected in series between the output (VOUT) of the boost converter 100 and ground, and thus comprise a voltage divider to generate a feedback voltage Vfb that is proportional to VOUT (Vfb=VOUT*(R2/(R1+R2))).

In this example, the HS transistor is a p-channel field effect transistor (PFET), and the LS transistor is an n-channel field effect transistor (NFET). The inductor L1 is coupled between the input terminal 101 (and thus Vin) and the drain of the HS transistor at a switch node (SW). The current through the inductor L1 is designated as IL. The driver logic 125 generates gate signals HS_G and LS_G. Gate signal HS_G is provided to the gate of the HS transistor, and gate signal LS_G is provided to the gate of the LS transistor. In general, HS_G is the logical inverse of LS_G (including some dead time during each change of state of the switching transistors). The source of the LS transistor is coupled to ground (PGND), and thus when the LS transistor is ON, the voltage on the SW node is pulled low toward ground (approximately equal to PGND). When the LS transistor is OFF and the HS transistor is ON, the SW node voltage is forced high.

The error amplifier 115 has a negative input (−) and a positive input (+). The negative input is coupled to resistor R2 and receives Vfb. A reference voltage VFEF is provided to the positive input of the error amplifier 115. The output of the error amplifier 115 provides an output signal, Vea, whose magnitude is proportional to the difference between Vfb and VREF. Transistors M4 and M5 (both NFETs in this example) are included. The gates of transistors M4 and M5 are coupled to the output of the error amplifier and thus receive Vea. Transistor M4 converts Vea to a current Iea through resistor R4 to ground. Similarly, transistor M5 converts Vea to a current Iea through resistor R5 to ground. Capacitors C1 and C2 and resistor R3 implement a low-pass filter for Vea to compensate for the loop stability.

Sense circuit 110 is coupled to the HS transistor and senses the current through the HS transistor when the HS transistor is ON. The sense circuit 110 includes transistors M1, M2, and M3 (all PFETs in this example). The source of the HS transistor is coupled to the source of transistor M1, and the drain of the HS transistor is coupled to the source of transistor M3. The output terminal 102 is coupled to the drain of the HS transistor. The gates of the HS transistor and transistors M1-M3 are coupled together. The drain of transistor M1 and the source of transistor M2 are coupled together. The current through transistor M1 is designated as I1, and the current through transistor M3 is designated as current I3. Current I1 is a scaled down version of current IL. Accordingly, current I1 is a sense current representation of IL. Numerous other implementations for a current sense circuit are possible as well.

The slope compensation circuit 150 is coupled to the drain of transistor M2 and to the negative (−) input of the comparator 120. In this example, the sense current is slope-compensated. The slope compensation circuit 150 produces a ramp current (ISLP). If Islp=0 and Ios=0, when the control loop is "closed" (that is, when the control loop has reached a steady state), the control loop will be at a state in which VEA (IEA) is at a level so as to force the voltage on the drain of transistor M1 to be approximately equal to VOUT. Because the SW node voltage is higher than VOUT due to the direction of the current flow of current IL, the drain-to-source voltage (Vds) of the HS transistor is approximately equal to the Vds of transistor M1. Accordingly, current I1 is a scaled-down version of IL. Transistors M2 and M3 are the same size in this embodiment, I1 is equal to Iea, and I2 also is equal to Iea (assuming Islp and Ios are both 0 amperes). The Vds of transistor M2 is the same as the Vds of transistor M3. As a result, the control loop will force the voltage on the negative input of comparator 120 to be approximately equal to the voltage on the positive input of the comparator. The addition of the slope current Islp helps to stabilize the operation of the converter but renders Vea (or Iea) to be less than an ideal representation of current IL.

During operation, the control loop attempts to make the slope-compensated sense current approximately equal to Iea. If the output voltage deviates from its target regulated level, the sense current will increase or decrease thereby causing the output of comparator 120 to become logic high or low. The driver logic 125 responds by adjusting the duty cycle of the next switching cycle to force Vout to return closer to its target level.

Figure 2:
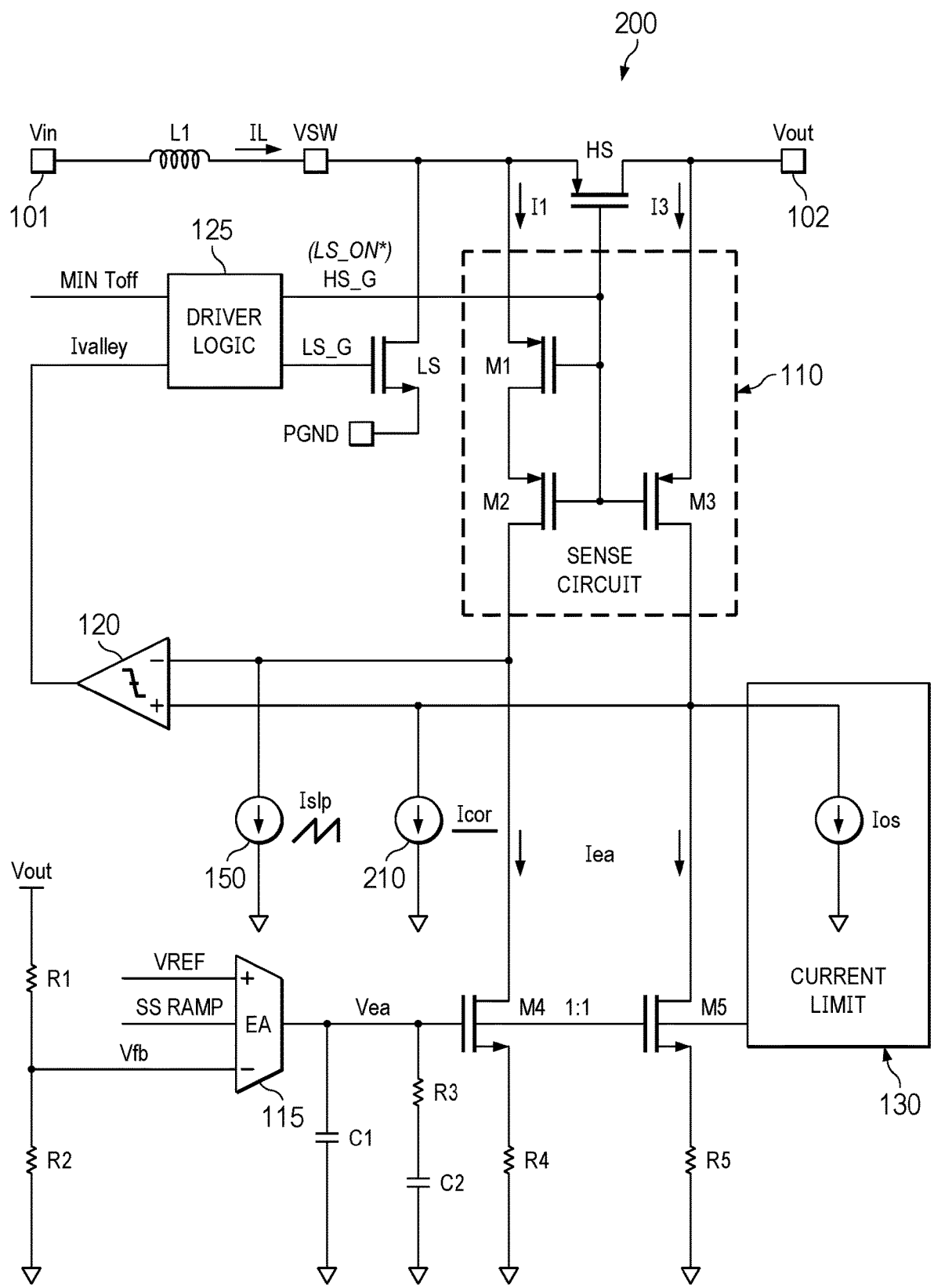
FIG. 2 is a schematic illustrating a boost converter that includes a slope compensation circuit and a peak detection sample-and-hold circuit, in accordance with an example.

FIG. 2 is a schematic diagram of a boost converter 200 that has many of the same components and connections therebetween as the boost converter 100. For example, the boost converter 200 includes inductor L1, the HS and LS transistors, the sense circuit 110, the error amplifier 115, resistors R1-R5, capacitors C1 and C2, comparator 120, driver logic 125, current limit circuit 130, slope compensation circuit 150, and a peak detection sample-and-hold circuit 210. Resistors R1 and R2 are connected in series between VOUT and ground to provide a scaled-down version of Vout (Vfb) to the negative input of the error amplifier 115. Reference voltage VFEF is coupled to the positive input of the error amplifier 115. The output of the error amplifier 115 provides output signal Vea. The gates of transistors M4 and M5 are coupled to the output of the error amplifier and thus receive Vea.

The inductor L1 is coupled between the input terminal 101 and the drain of the HS transistor at switch node SW. The driver logic 125 generates gate signals HS_G and LS_G. Gate signal HS_G is provided to the gate of the HS transistor, and gate signal LS_G is provided to the gate of the LS transistor. The source of the LS transistor is coupled to PGND.

Sense circuit 110 is coupled to the HS transistor and senses the current through the HS transistor when the HS transistor is ON. The sense circuit 110 includes transistors M1, M2, and M3, and are connected as described above.

The slope compensation circuit 150 is coupled to the drain of transistor M2 and to the negative (−) input of the comparator 120. In this example, the sense current is slope-compensated. The slope compensation circuit 150 produces ramp current (ISLP).

Figure 3:
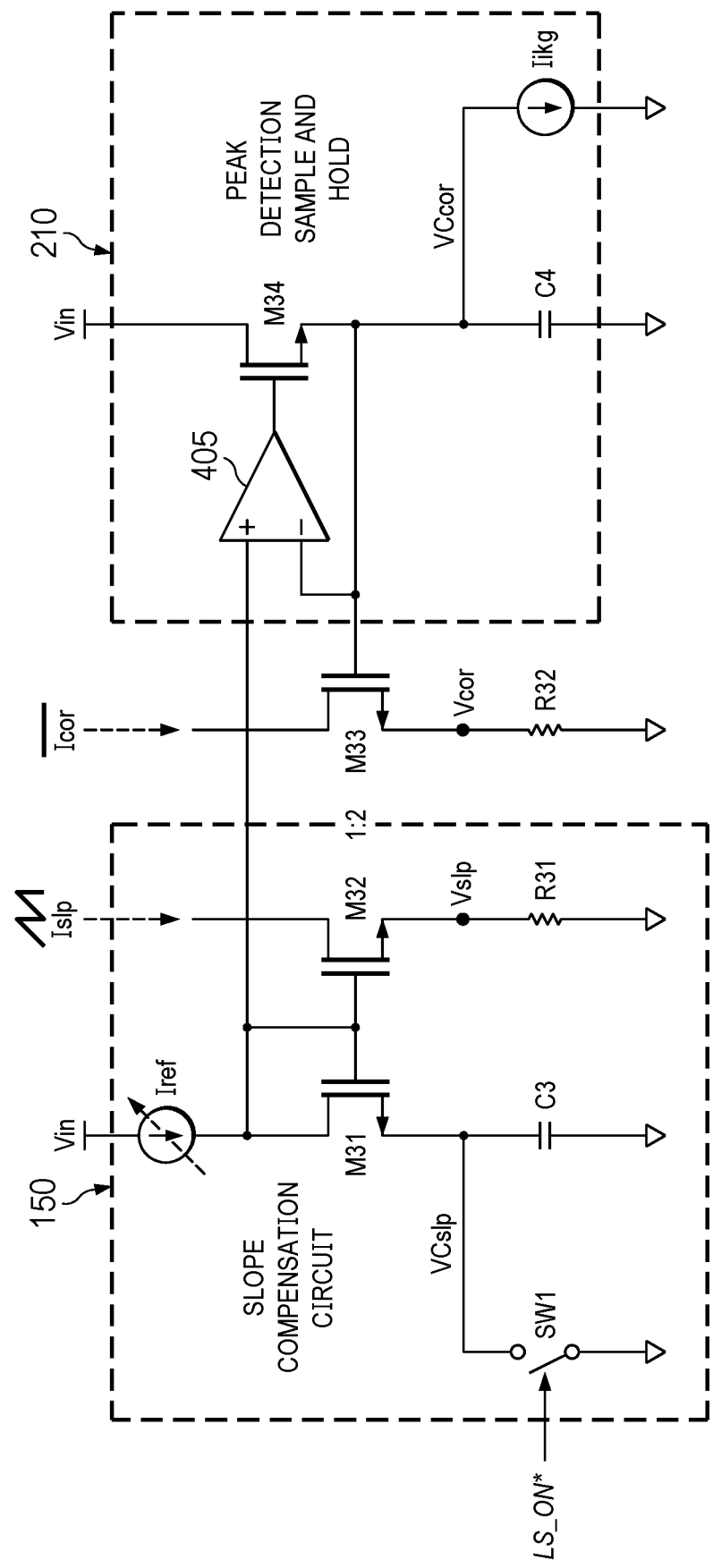
FIG. 3 is a schematic of a slope compensation circuit coupled to the peak detection sample-and-hold circuit, in accordance an example.

To offset the error introduced by Islp, which slope-compensates the sense current I1, the peak detection sample-and-hold circuit of the converter 200 of FIG. 2 is coupled to the positive input of the comparator 120 and is configured to add a commensurate amount (Icor) of current to Iea. FIG. 3 is a circuit schematic of an example implementation of the slope compensation circuit 150 and the peak detection sample-and-hold circuit 210. The slope compensation circuit 150 includes a current source circuit Iref, transistors M31 and M32, a switch SW1 (e.g., a transistor), a capacitor C3, and a resistor R31. Transistors M31 and M32 are NFETs in this example. The gates of transistors M31 and M32 are coupled together and to the current source circuit IREF. "IREF" refers to the circuit that produces the current and the magnitude of the current. Capacitor C3 is coupled between the source of transistor M31 and ground. Switch SW1 is coupled in parallel with capacitor C3. Resistor R31 is coupled between the source of transistor M32 and ground.

Figure 4:
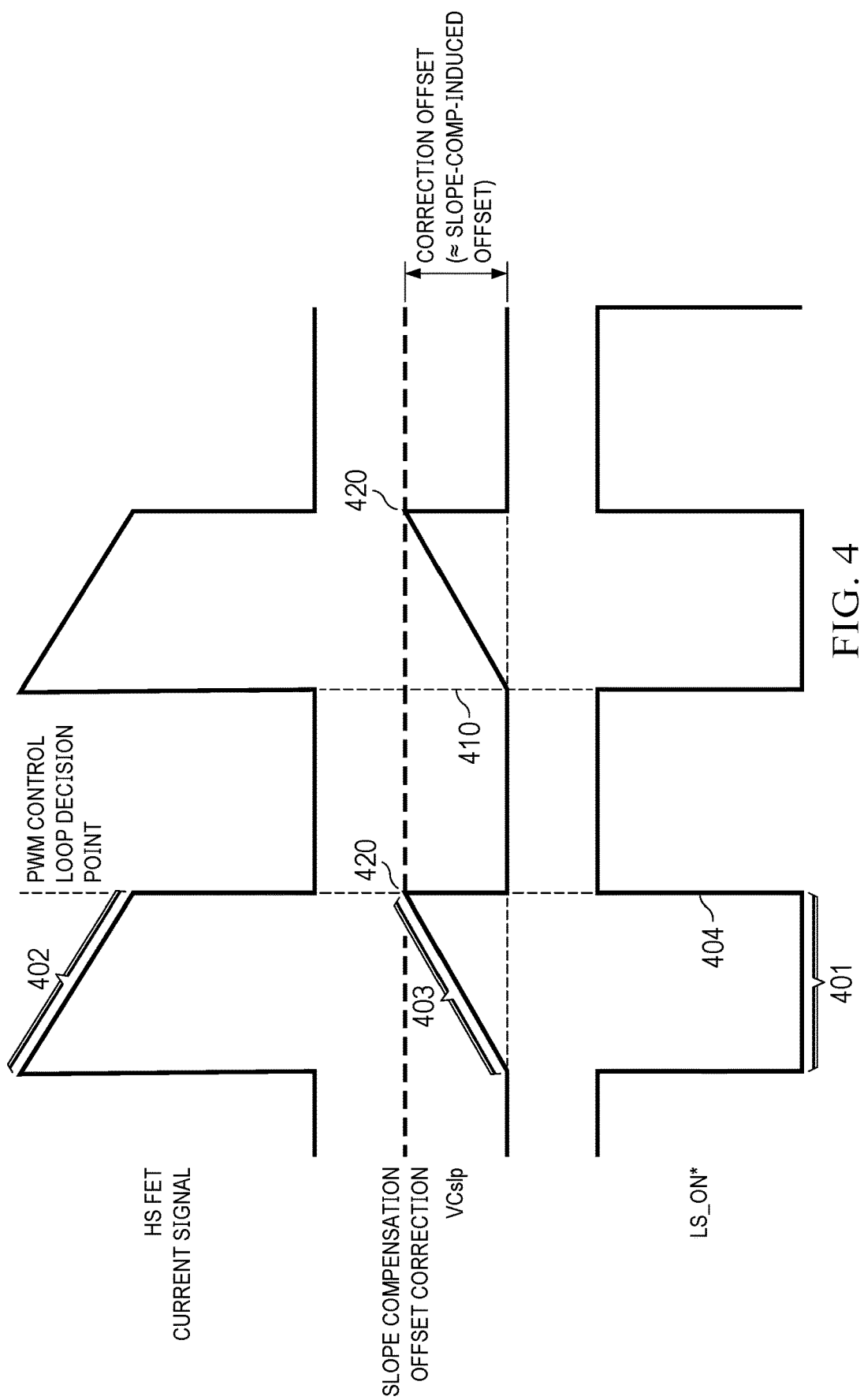
FIG. 4 are waveforms illustrating signals within the boost converter of FIG. 2 and the slope compensation and peak detection sample-and-hold circuits of FIG. 3, in accordance with an example.

FIG. 4 is a timing diagram related to the FIG. 3. Switch SW1 is controlled by LS_ON*, which is cleared low when the HS transistor is ON (and the LS transistor is OFF). When LS_ON* is low (401), the current through the HS transistor decreases as shown at 402. At the same time, switch SW1 is OFF and the current Iref flows through transistor M31 to capacitor C3, thereby causing the voltage (VCslp) across capacitor C3 to ramp up as shown at 403. Responsive to LS_ON* being set high (404), switch SW1 closes and VCslp falls to ground until the next switching cycle.

The voltage waveform on the gates of transistors M31 and M32 is VCslp plus the gate-to-source voltage (Vgs) of transistor M31. The voltage on the source of transistor M32 (Vslp) is 1 Vgs below the voltage on the gate of transistor M32. Thus, Vslp is approximately equal to VCslp and has waveform that largely is the same as the VCslp waveform shown in FIG. 4. The current through resistor R31 is Vslp/R31 and has the same waveform shape as Vslp. The current through resistor is Islp—the slope compensation current.

The peak detection sample-and-hold circuit 210 includes an amplifier 405, a transistor M34, a capacitor C4, and a current source circuit Ilkg. The positive input of amplifier 405 is coupled to the gates of transistors M31 and M32, and thus receive the ramp waveform of VCslp plus the Vgs of transistor M31. The negative input of the amplifier 405 is coupled to the source of transistor M34 and to the gate of a transistor M33. The source of transistor M34 is coupled to the upper plate of capacitor C4 and to the current source circuit Ilkg. The voltage across capacitor C4 is labeled VCcor. The drain of transistor M34 is coupled to Vin.

As the voltage on the positive input of the amplifier 405 increases, transistor M34 turns ON and current flows through the transistor to capacitor C4 to thereby increase the voltage across capacitor C4 (VCcor). Upon the voltage on the positive input of the amplifier suddenly dropping (e.g., at a falling edge 410), the voltage on the negative input of the amplifier does not drop as fast because of the charge on capacitor C4. Accordingly, the output voltage from the amplifier to the gate of transistor M34 is forced low thereby turning OFF transistor M34 and charge current to the capacitor C4. The voltage VCcor thus remains fixed. VCcor increases (tracks) while VCslp (and thus Islp) increases, and is then held at its level when VCslp (and Islp) suddenly falls. Points 420 in FIG. 4 identify the sampling points at which the peak detection sample-and-hold circuit 210 samples VCslp at approximately the moment at which the HS transistor turns OFF due to the HS transistor current falling to the valley command current.

The current source circuit Ilkg is a relatively small current source that provides a discharge current path for capacitor C4 in the event that VCslp changes to a lower voltage. If the ramp voltage decreases over time, some of the charge on capacitor C4 will need to be removed for the voltage VCcor to be reset to the lower corresponding voltage level. Current source Ilkg is a small leakage current source that removes some of the charge on capacitor C4 to reduce its voltage as needed.

Figure 5:
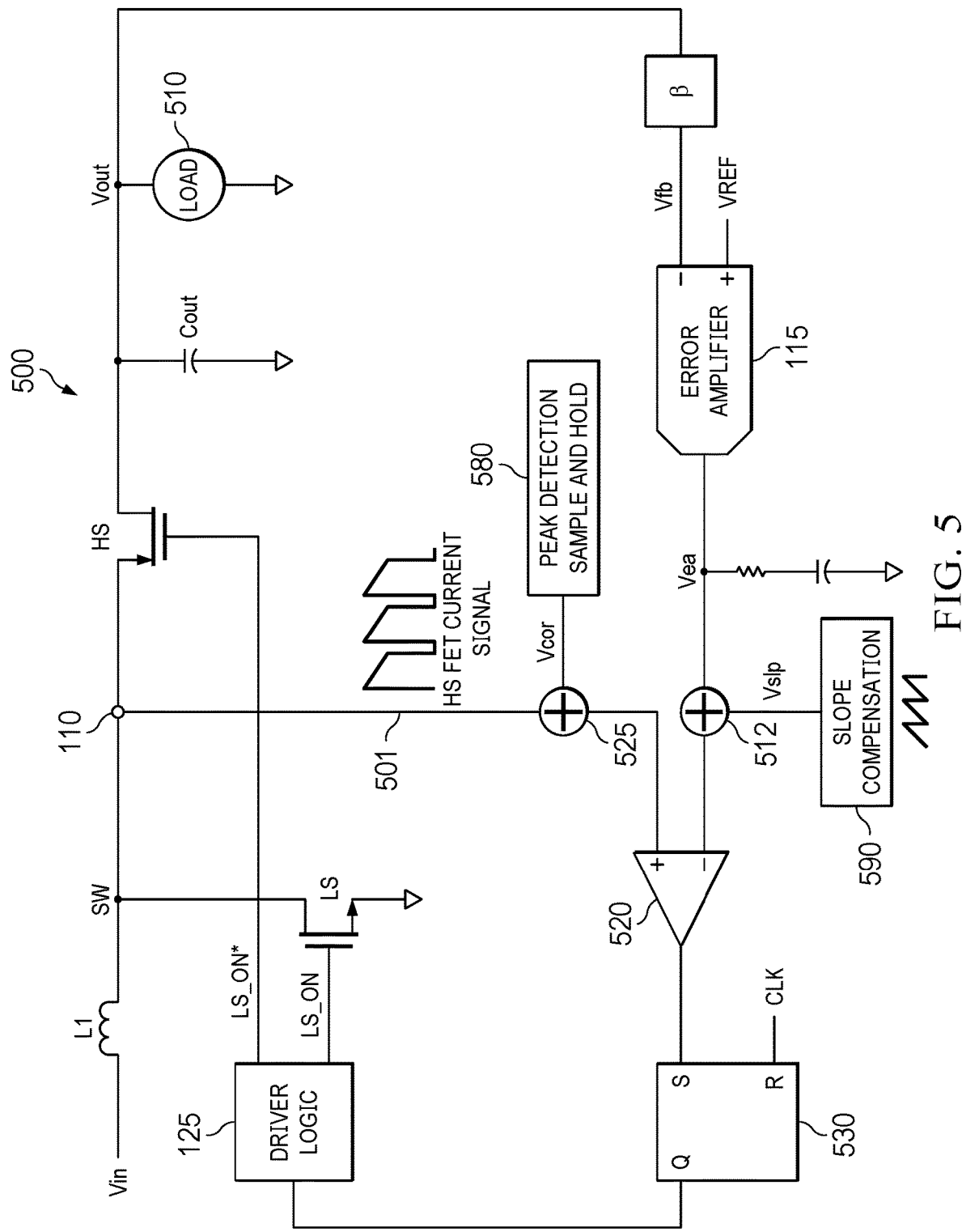
FIG. 5 is a schematic of a valley current mode boost converter in which slope compensation is implemented for the error signal and an offset correction signal is provided to the sense signal from the high side transistor, in accordance with an example.

FIG. 5 is an embodiment of boost converter 500 in which the error signal is slope-compensated and the correction offset is added to the sense current. The sense circuit 110 is shown symbolically in FIG. 5. A load 510 and the output capacitor Cout also are shown coupled to the source of the HS transistor. An error amplifier 115 amplifies the difference between Vref and Vfb (The symbol 'β' refers to the scaling factor implemented by the voltage divider described above). A slope-compensated ramp signal (Vslp) is generated by a slope compensation circuit 590 and added to Vea from the error amplifier at summing junction 512. The HS transistor sense current signal 501 is a voltage that is proportional to the HS transistor current. A correction offset voltage (Vcor) is generated by a peak detection sample- and hold circuit 580 and added to the HS transistor sense current signal 501 at summing junction 525. A comparator 520 compares the slope-compensated error signal with the HS transistor sense current signal 501 (to which the correction offset voltage is added). The output of comparator 520 is coupled to a set (S) input of an SR latch 530, the output (Q) of which is coupled to the drive logic 125.

Figure 6:
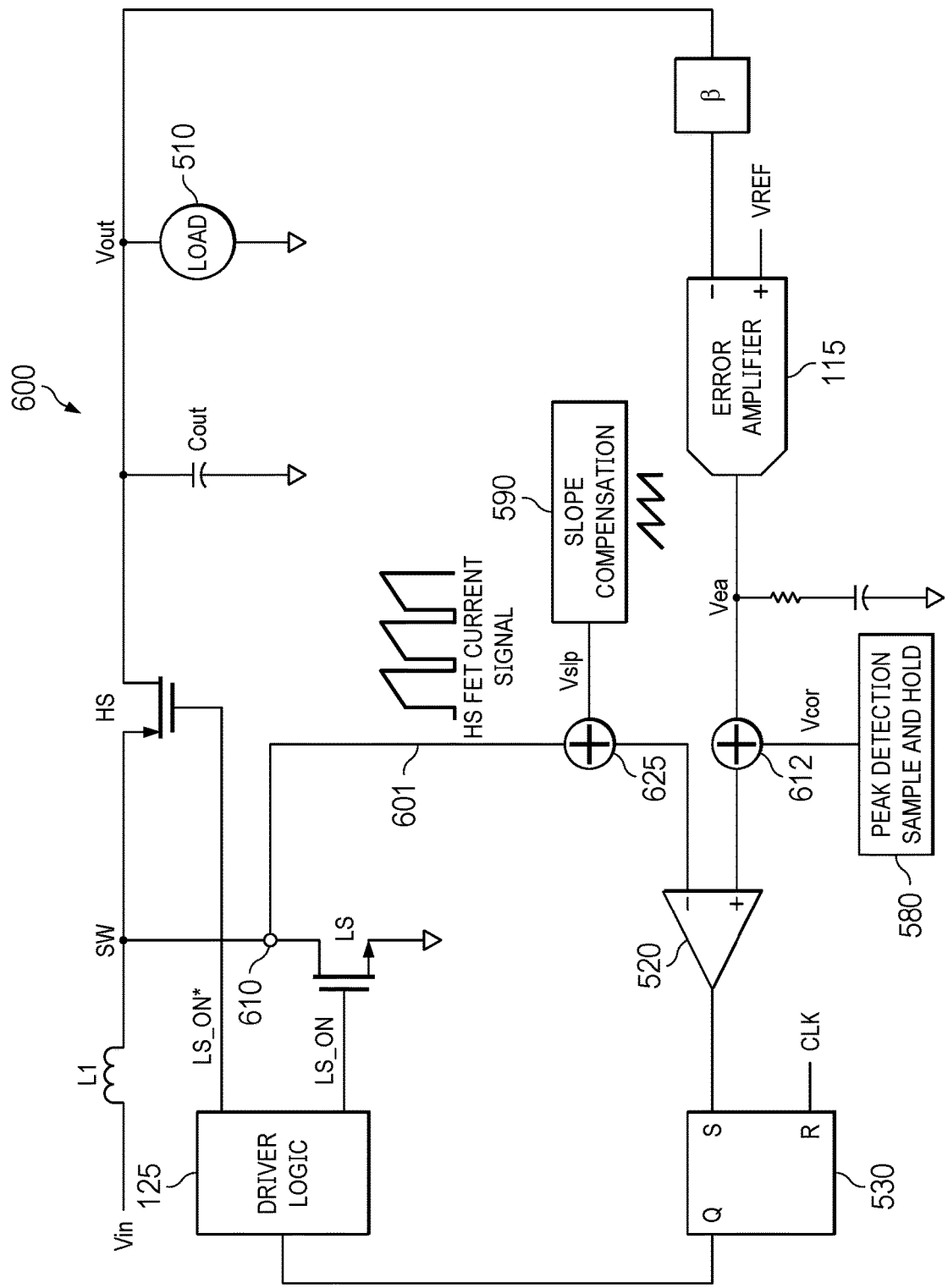
FIG. 6. is a schematic of a peak current mode boost converter in which slope compensation is implemented on the sense signal from the low side transistor, and an offset correction signal is provided for the error signal.

FIG. 6 is an embodiment of a valley current mode control boost converter 600 in which a sense current signal 610 from the LS transistor is slope-compensated, and the correction offset is added to the error signal Vea. In this case, the boost converter is peak current controlled meaning that the boost converter implements peak current mode control in which a rising current through the LS transistor is compared to peak current command current. A sense circuit 610 is coupled to the LS transistor and produces a LS transistor sense current signal 601 that is a voltage proportional to the LS transistor current. Error amplifier 115 amplifies the difference between Vref and Vfb. A slope-compensated ramp signal (Vslp) from slope compensation circuit 590 is added to the LS transistor sense current signal 601 at junction 625. Peak detection sample-and-hold circuit 580 generates the correction offset voltage (Vcor) which is added to the error signal Vea at summing junction 612. Comparator 520 compares the slope-compensated LS transistor current sense signal with the error signal Vea (to which the correction offset voltage is added). The output of comparator 520 is coupled to the S input of the SR latch 530, the output (Q) of which is coupled to the drive logic 125.

Figure 7:
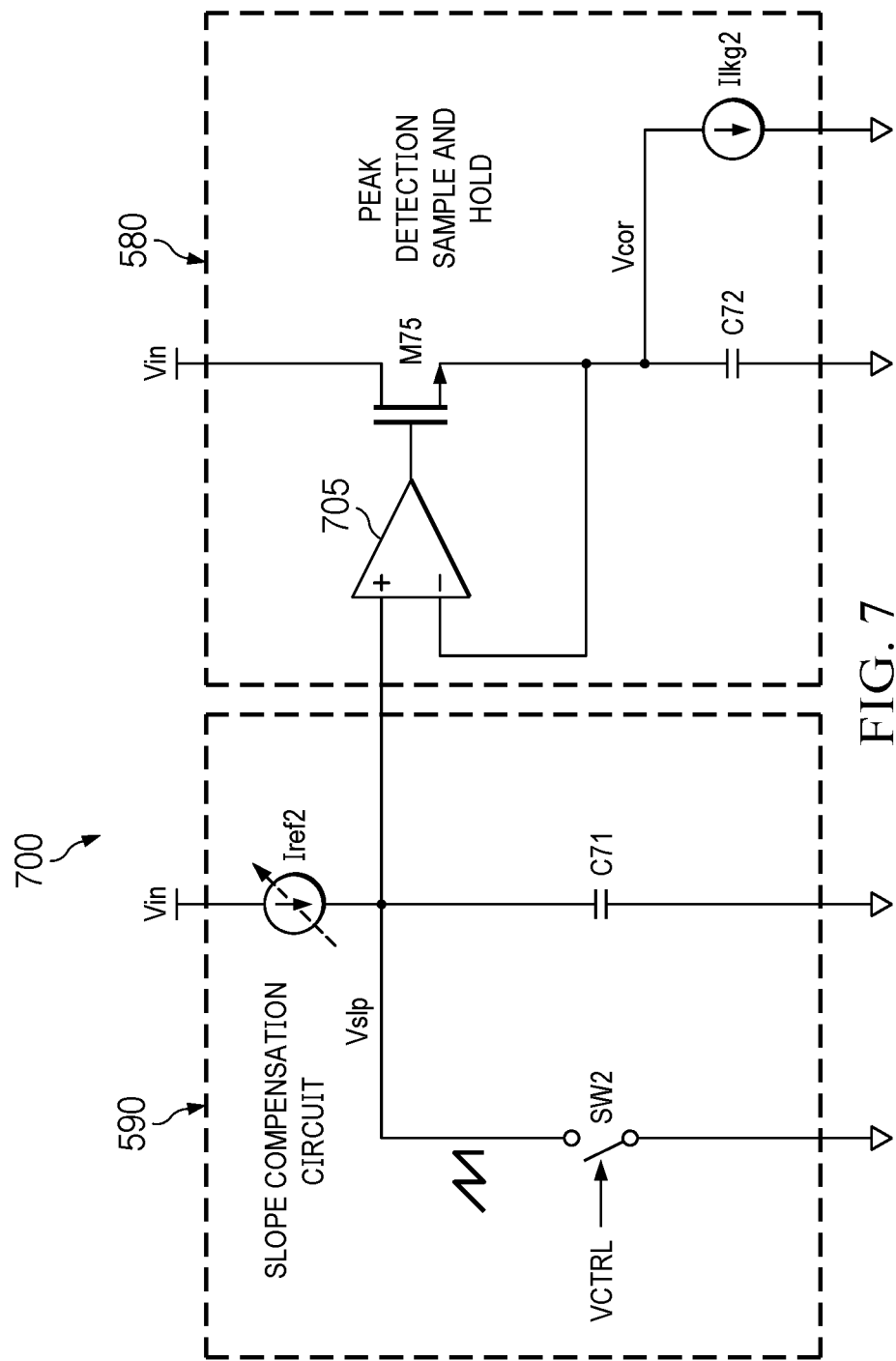
FIG. 7 is a schematic of a slope compensation circuit coupled to the peak detection sample-and-hold circuit, in accordance another example.

FIG. 7 is a schematic showing a peak current mode control boost converter example implementation of the slope compensation circuit 590 and the peak detection sample-and hold circuit 580. For example, the slope compensation circuit 590 includes a reference current circuit (Iref2), a capacitor C71, and a switch SW2 (e.g., a transistor). The T/H includes a capacitor C72, a transistor M75, a current source circuit Ilkg2, and an amplifier 705. Current Iref2 charges capacitor C71 when switch SW2 is open (off). Switch SW2 is controlled by signal VCTRL. VCTRL can be either LS_ON or LS_ON* depending upon the type of control loop. For example, LS_ON may be used for a valley current mode boost converter or a peak current mode buck converter, and the logical inverse of LS_ON may be used for a peak current mode boost converter or a valley current mode buck converter. When VCTRL is low, switch SW2 is off. When VCTRL is high, switch SW2 is on. Thus, capacitor C71 charges when the switch SW2 is OFF. The voltage on the capacitor C71 is Vslp and is a ramp waveform as shown. Vslp is provided to the positive input of amplifier 710. Amplifier 710, transistor M75, capacitor C72, and current source circuit Ilkg2 are coupled together and operate much the same as described above for peak detection sample-and-hold circuit 210. Charge current flows through transistor M75 to capacitor C72 while Vslp ramps up. Upon a sudden drop in Vslp, the output voltage of amplifier 705 drops to a level at which transistor M75 turns off thereby holding the voltage on capacitor C72 (Vcor). The current source Ilkg2 is a small current source to partially discharge capacitor C72 for smaller levels of Vslp, as described above.

Figure 8:
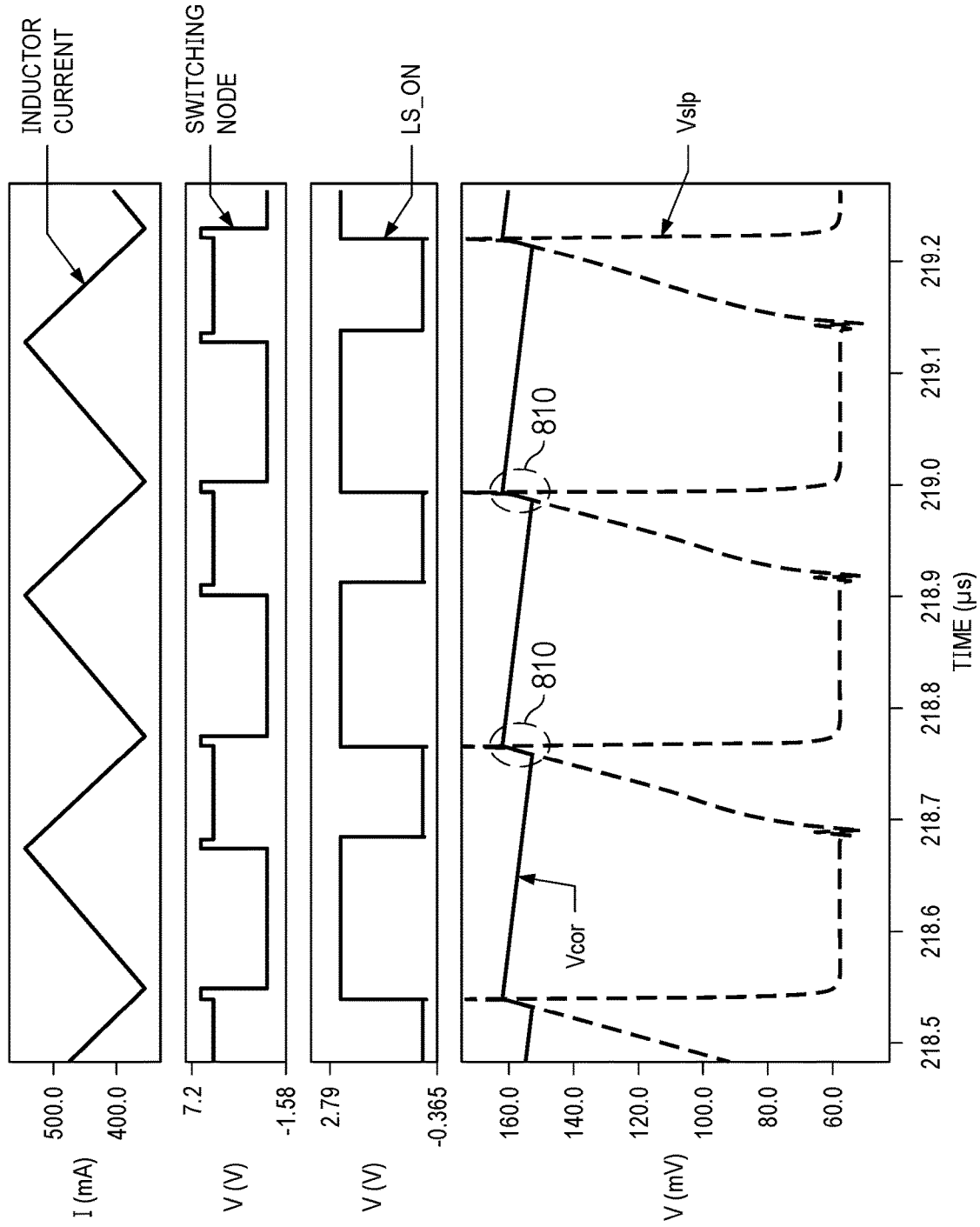
FIG. 8 are waveforms illustrating the operation of the boost converter, in accordance with an example.

FIG. 8 includes valley current mode control boost converter example waveforms for inductor current, the voltage on SW, the LS_ON* signal, Vslp, and Vcor. When LS_ON* is logic high, the inductor current increases (ramps up). When LS_ON* is logic low, the inductor current decreases (ramps down). The switch node voltage is logic low when LS_ON* is high, and logic high otherwise. During each switching cycle, Vcor decreases as shown due to the slow discharge of the capacitor within the applicable T/H circuit (e.g., capacitor C4 or C72). Vslp rises and is sampled at points 810 upon the occurrence of each rising edge of LS_ON*.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a PFET may be used in place of an NFET, an NFET in place of a PFET, a bipolar junction transistor in place of a FET, etc.

References herein to a FET being "ON" means that the conduction channel of the FET is present and drain current may flow through the FET. References herein to a FET being "OFF" means that the conduction channel is not present and drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A voltage converter, comprising:
   a first transistor having a first control terminal and a first current terminal;
   a sense circuit coupled to the first current terminal;
   a comparator having a comparator input and a comparator output, the comparator output coupled to the first control terminal;
   an error amplifier having an error amplifier output, the error amplifier output coupled to the comparator input;
   a slope compensation circuit coupled to at least one of the error amplifier output or the sense circuit;
   an amplifier having an amplifier input, and an amplifier output;
   a second transistor having a second control terminal and a second current terminal, the second control terminal coupled to the amplifier output; and
   a capacitor having a terminal coupled to the second current terminal and to the amplifier input.

2. The voltage converter of claim 1, wherein the amplifier, the second transistor, and the capacitor form a peak detection sample and hold circuit.

3. The voltage converter of claim 1, wherein the slope compensation circuit has first and second slope compensation circuit outputs, the amplifier input is a first amplifier input, the amplifier has a second amplifier input, the first slope compensation circuit output coupled to the at least one of the error amplifier output or the sense circuit, and the second slope compensation circuit output coupled to the second amplifier input.

4. The voltage converter of claim 1, wherein the slope compensation circuit has a slope compensation circuit output coupled to the at least one of the error amplifier output or the sense circuit, the amplifier input is a first amplifier input, the amplifier has a second amplifier input, and the slope compensation circuit output coupled to the second amplifier input.

5. The voltage converter of claim 1, wherein the capacitor is a first capacitor, the amplifier input is a first amplifier input, the amplifier has a second amplifier input, and the slope compensation circuit includes:
   a second capacitor configured to be charged responsive to the first transistor being on; and
   a current source coupled to the second capacitor and to the second amplifier input.

6. The voltage converter of claim 1, further comprising an inductor coupled to the first current terminal.

7. The voltage converter of claim 1, wherein the sense circuit is configured to generate a sense signal responsive to a current through the first transistor.

8. The voltage converter of claim 1, wherein the voltage converter is boost converter or a buck converter.

9. A voltage converter, comprising:
   an inductor;
   a transistor having a control terminal and a first current terminal, the first current terminal coupled to the inductor;
   a sense circuit coupled to the transistor;
   a comparator having first and second comparator inputs and a comparator output, the comparator output coupled to the control terminal;
   an error amplifier having an error amplifier input and an error amplifier output, the error amplifier output coupled to the first comparator input;
   a slope compensation circuit coupled to at least one of the error amplifier output or the sense circuit, the slope compensation circuit configured to generate a slope signal; and
   an amplifier having an amplifier input and an amplifier output;
   a second transistor having a second control input and a second current terminal, the control terminal coupled to the amplifier output; and
   a capacitor having a terminal coupled to the second current terminal and to the amplifier input.

10. The voltage converter of claim 9, wherein the slope compensation circuit has first and second slope compensation circuit outputs, the amplifier input is a first amplifier input, the amplifier has a second amplifier input, the first slope compensation circuit output coupled to the at least one of the error amplifier output or the sense circuit, and the second slope compensation circuit output coupled to the second amplifier input.

11. The voltage converter of claim 9, wherein the slope compensation circuit has a slope compensation circuit output coupled to the at least one of the error amplifier output or the sense circuit, the amplifier input is a first amplifier input, the amplifier has a second amplifier input, and the slope compensation circuit output coupled to the second amplifier input.

12. The voltage converter of claim 9, wherein the capacitor is a first capacitor, the amplifier input is a first amplifier input, the amplifier has a second amplifier input, and the slope compensation circuit includes:
   a second capacitor configured to be charged responsive to the transistor being on; and
   a current source coupled to the second capacitor and to the first second amplifier input.

13. The voltage converter of claim 9, wherein the voltage converter is a boost converter or a buck converter.

14. A voltage converter, comprising:
   a sense circuit configured to generate a sense signal;
   a comparator having a comparator input;
   an error amplifier having an error amplifier output, the error amplifier output coupled to the first comparator input;
   a slope compensation circuit coupled to at least one of the error amplifier output or the sense circuit, the slope compensation circuit configured to generate a slope signal; and
   a sample-and-hold (S/H) circuit having a S/H input and a S/H output, the S/H circuit comprising:
      an amplifier having a first amplifier input, a second amplifier input, and an amplifier output, the first amplifier input configured to receive the slope signal;
      a transistor having a control terminal and a current terminal, the amplifier output coupled to the control terminal; and
      a capacitor having a terminal coupled to the current terminal and to the second amplifier input.

15. The voltage converter of claim 14, wherein the S/H circuit is a peak detection S/H circuit.

16. The voltage converter of claim 14, wherein the transistor is a first transistor, the control terminal is a first control terminal, the voltage converter further comprising a second transistor having a second control input and a second current terminal, and the second current terminal coupled to the sense circuit, and wherein a comparator output of the comparator is configured to control a signal to the first control terminal.

17. The voltage converter of claim 14, wherein the slope compensation circuit has first and second slope compensation circuit outputs, the first slope compensation circuit output coupled to the at least one of the error amplifier output or the sense circuit, and the second slope compensation circuit output coupled to the first amplifier input.

18. The voltage converter of claim 14, wherein the slope compensation circuit has a slope compensation circuit output coupled to the at least one of the error amplifier output or the sense circuit, and the slope compensation circuit output coupled to the first amplifier input.

* * * * *